US012620633B2

(12) United States Patent
Wu et al.

(10) Patent No.: US 12,620,633 B2
(45) Date of Patent: May 5, 2026

(54) LITHIUM-ION BATTERY AND ELECTRIC DEVICE

(71) Applicant: CONTEMPORARY AMPEREX TECHNOLOGY CO., LIMITED, Ningde (CN)

(72) Inventors: Kai Wu, Ningde (CN); Hao Jiang, Ningde (CN); Chenglong Yang, Ningde (CN); Jingyu Gao, Ningde (CN); Aosai Chen, Ningde (CN); Haiming Zhang, Ningde (CN); Honggang Yu, Ningde (CN); Haizu Jin, Ningde (CN); Li Luo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/287,788

(22) Filed: Jul. 31, 2025

(65) Prior Publication Data

US 2025/0357542 A1 Nov. 20, 2025

Related U.S. Application Data

(63) Continuation of application No. PCT/CN2023/134415, filed on Nov. 27, 2023.

(30) Foreign Application Priority Data

Jun. 30, 2023 (CN) .......................... 202310794171.5

(51) Int. Cl.
*H01M 10/42* (2006.01)
*H01M 4/02* (2006.01)
(Continued)

(52) U.S. Cl.
CPC ......... *H01M 10/4235* (2013.01); *H01M 4/13* (2013.01); *H01M 10/0525* (2013.01);
(Continued)

(58) Field of Classification Search
CPC ......... H01M 10/0525; H01M 10/0567; H01M 10/0568
See application file for complete search history.

(56) References Cited

U.S. PATENT DOCUMENTS

2018/0062201 A1 3/2018 Zhu et al.
2020/0313171 A1* 10/2020 Wang .................. H01M 4/1393
(Continued)

FOREIGN PATENT DOCUMENTS

CN 112640185 A 4/2021
CN 114388811 A 4/2022
(Continued)

OTHER PUBLICATIONS

The international search report received in the counterpart International Application No. PCT/CN2023/134415, dated Mar. 7, 2024, 5 pages with English translation.
(Continued)

*Primary Examiner* — Susan D Leong
*Assistant Examiner* — Timothy G Hemingway
(74) *Attorney, Agent, or Firm* — K&L Gates LLP

(57) ABSTRACT

Embodiments of the present application disclose a lithium-ion battery and an electric device. The lithium-ion battery includes an electrolyte including a metal ion, where a reduction potential of the metal ion is higher than a reduction potential of a lithium ion; and a low CB value region, where a CB value of the lithium ion in the low CB value region satisfies: 0<CB<1, and the CB value is a ratio of a capacity of a negative electrode active material per unit area to a capacity of a positive electrode active material per unit area.
(Continued)

The lithium-ion battery provided in the present application can effectively solve the problem of lithium deposition in the low CB value region.

19 Claims, 3 Drawing Sheets

(51) Int. Cl.
    *H01M 4/13*         (2010.01)
    *H01M 10/0525*     (2010.01)
    *H01M 10/0568*     (2010.01)

(52) U.S. Cl.
    CPC .. *H01M 10/0568* (2013.01); *H01M 2004/021*
        (2013.01); *H01M 2004/027* (2013.01); *H01M*
                         *2300/002* (2013.01)

(56)           References Cited

U.S. PATENT DOCUMENTS

| | | | | |
|---|---|---|---|---|
| 2020/0321655 | A1* | 10/2020 | Vaughey | .......... H01M 10/0525 |
| 2022/0359913 | A1 | 11/2022 | Honda | |

FOREIGN PATENT DOCUMENTS

| | | | | |
|---|---|---|---|---|
| CN | 114883521 | B | 10/2022 | |
| CN | 115249785 | A | 10/2022 | |
| CN | 115249812 | A | 10/2022 | |
| CN | 115732760 | A | 3/2023 | |
| CN | 115810797 | A | 3/2023 | |
| CN | 115838163 | A | 3/2023 | |
| EP | 4273987 | A1 | 11/2023 | |
| EP | 4517906 | A1 | 3/2025 | |
| EP | 4583208 | A1 | 7/2025 | |
| EP | 4618191 | A1 | 9/2025 | |
| JP | 2000100468 | A | 4/2000 | |
| WO | WO-2013108841 | A1 * | 7/2013 | ........ H01M 10/0525 |

OTHER PUBLICATIONS

The ISA written opinion received in the counterpart International Application No. PCT/CN2023/134415, dated Mar. 7, 2024, 6 pages with English translation.

The extended European search report received in the corresponding EP Application No. 23943343.6, dated Mar. 30, 2026, 15 pages.

\* cited by examiner

300

400

500

500

501

400

502

LITHIUM-ION BATTERY AND ELECTRIC DEVICE

CROSS-REFERENCE TO RELATED APPLICATIONS

This patent document is a continuation of PCT Application No. PCT/CN2023/134415, filed on Nov. 27, 2023, which claims priority to and the benefit of Chinese Patent Application No. 202310794171.5 filed on Jun. 30, 2023 entitled "LITHIUM-ION BATTERY AND ELECTRIC DEVICE". The entire content of the above patent application is incorporated by reference into a part of the disclosure of this patent document.

TECHNICAL FIELD

The present application relates to the field of batteries, and more particularly, to a lithium-ion battery and an electric device.

BACKGROUND

In recent years, lithium-ion batteries have been widely used in energy storage power supply systems such as hydropower, thermal power, wind power and solar power plants, as well as in multiple fields such as electric tools, electric bicycles, electric motorcycles, electric vehicles, military equipment and aerospace, and thus have achieved great development.

In the preparation process of lithium-ion batteries, due to process limitations, a position where the capacities of the positive and negative electrodes are not matched will inevitably occur, that is, there will be a low CB value region. The negative electrode plate corresponding to the low CB value region easily undergoes lithium deposition, which adversely affects the capacity and safety of lithium-ion batteries. Therefore, how to improve the influence of lithium deposition on the performance of ion batteries is an urgent technical problem to be solved.

SUMMARY

The present application is made in view of the above technical problem, and an objective thereof is to provide a lithium-ion battery and an electric device. The lithium-ion battery includes an electrolyte containing a metal ion, which can effectively improve the problem of lithium deposition in a low CB value region.

In a first aspect, a lithium-ion battery is provided, including: an electrolyte including a metal ion, where a reduction potential of the metal ion is higher than a reduction potential of a lithium ion; and a low CB value region, where a CB value of the lithium-ion battery in the low CB value region satisfies: 0<CB<1, and the CB value is a ratio of a capacity of a negative electrode active material per unit area to a capacity of a positive electrode active material per unit area.

At the low CB value region of the lithium-ion battery, the CB value is less than 1. In other words, the capacity of the positive electrode active material per unit area is larger than the capacity of the negative electrode active material per unit area in the low CB value region. Therefore, lithium deposition easily occurs at a negative electrode plate corresponding to the low CB value region in the cycling process. In embodiments of the present application, the metal ion with a reduction potential higher than that of the lithium ion is introduced into the electrolyte. When lithium deposition occurs at the negative electrode plate corresponding to the low CB value region, the metal ion in the electrolyte can freely move to a position of lithium deposition and be reduced to a metal simple substance by lithium. Thus, the situation of lithium deposition in the low CB value region is improved, which helps to increase the reversible capacity and cycling performance of the lithium-ion battery.

In a possible implementation, the lithium-ion battery includes a negative electrode plate, where a percentage X of an area of the negative electrode plate corresponding to the low CB value region in an area of the negative electrode plate satisfies: 0%<X; optionally, 0%<X≤10%; and optionally, 0%<X≤2%.

In a possible implementation, a CB value of the lithium-ion battery in the low CB value region satisfies: 0.5<CB<1.

In a possible implementation, a reduction potential $\varphi(M^{n+}/M)$ of the metal ion satisfies: $\varphi(M^{n+}/M)+(RTlnC)/F \geq \varphi(Li^+/Li)$, where $M^{n+}$ represents the metal ion, n represents a valence of the metal ion, C represents a molar concentration of the metal ion in the electrolyte, R represents an ideal gas constant, T represents a temperature, F represents the Faraday constant, and $\varphi(Li^+/Li)$ represents a standard electrode potential of the lithium ion.

In embodiments of the present application, by selecting a metal ion whose reduction potential meets the above conditions, the metal ion can be reduced to a metal simple substance by deposited lithium, thereby improving the problem of lithium deposition in the low CB value region.

In a possible implementation, the reduction potential $\varphi(M^{n+}/M)$ of the metal ion satisfies: $\varphi(M^{n+}/M)+(RTlnC)/F \leq 3$ V vs. $Li^+/Li$.

In embodiments of the present application, by selecting a metal ion whose reduction potential meets the above conditions, while the metal ion can be reduced by lithium, it helps to reduce the oxidizing property of the metal ion, thereby reducing the influence of the metal ion on the electrolyte and the positive and negative electrode plates.

In a possible implementation, the molar concentration C of the metal ion in the electrolyte satisfies: 0.001 M≤C≤0.2 M.

In embodiments of the present application, by controlling the concentration of the metal ion in the electrolyte within an appropriate range, it helps to reduce the self-discharge of the lithium-ion battery while suppressing lithium deposition.

In a possible implementation, the metal ion includes at least one of $Mg^{2+}$, $Al^{3+}$, $Zn^{2+}$ and $Sb^{2+}$.

In a second aspect, a lithium-ion battery is provided, including: a low CB value region, where a CB value of the lithium-ion battery in the low CB value region satisfies: 0.5<CB<1; and a negative electrode plate, where a content of a metal element per unit area at the negative electrode plate corresponding to the low CB value region is greater than a content of a metal element at the negative electrode plate corresponding to a high CB value region, where a CB value of the lithium-ion battery in the high CB value region satisfies: CB≥1; the CB value is a ratio of a capacity of a negative electrode active material per unit area to a capacity of a positive electrode active material per unit area; and a reduction potential of a metal ion corresponding to the metal element is higher than a reduction potential of a lithium ion.

In a possible implementation, a percentage X of an area of the negative electrode plate corresponding to the low CB value region in an area of the negative electrode plate satisfies: 0%<X; optionally, 0%<X≤10%; and optionally, 0%<X≤2%.

In a possible implementation, a CB value of the lithium-ion battery at the low CB value region satisfies: 0.5<CB<1.

In a possible implementation, the metal element includes at least one of Mg, Al, Zn and Sb.

In a possible implementation, the lithium-ion battery includes: an electrolyte including a metal ion, where the metal ion is an ion corresponding to the metal element.

In a possible implementation, a molar concentration C' of the metal ion in the electrolyte satisfies: 0 M≤C'<0.2 M.

In a third aspect, an electric device is provided, including the lithium-ion battery in any possible implementation of the first aspect and/or the lithium-ion battery in any possible implementation of the second aspect.

DESCRIPTION OF DRAWINGS

In order to more clearly illustrate the technical solutions of the embodiments of the present application, the drawings required to be used in the embodiments of the present application will be briefly introduced below. Obviously, the drawings described below are only some embodiments of the present application. For persons of ordinary skill in the art, other drawings can also be obtained from the drawings without creative work.

DESCRIPTION OF EMBODIMENTS

Figure 1:
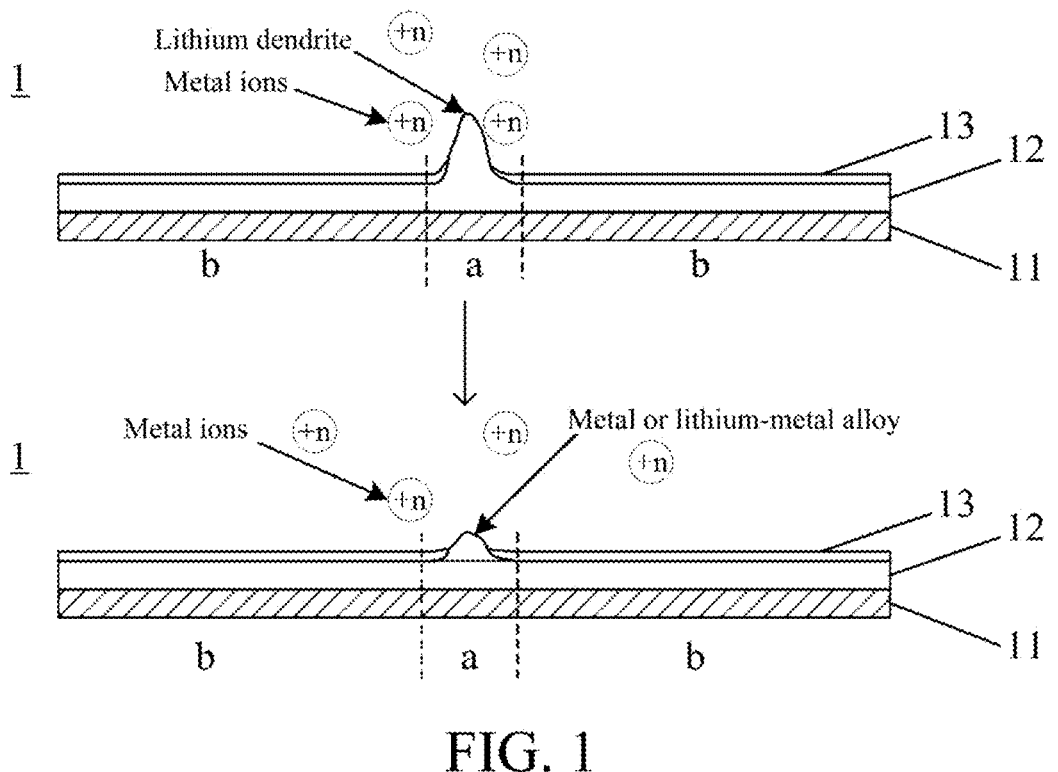
FIG. 1 is a schematic principle diagram of suppression of a lithium dendrite by metal ions.

Hereinafter, the implementations specifically disclosing a lithium-ion battery and an electric device of the present application will be described in detail with appropriate reference to the drawings. However, an unnecessary detailed description may be omitted. For example, a detailed description of well-known matters and repeated descriptions of a substantially same structure may be omitted. This is to avoid the following descriptions from becoming unnecessarily redundant and to facilitate understanding by those skilled in the art. The accompanying drawings and the following descriptions are provided for those skilled in the art to fully understand the present application, and are not intended to limit subject matters described in the claims.

The "range" disclosed in the present application is limited in the form of a lower limit and an upper limit. A given range is limited by selecting a lower limit and an upper limit, which define the boundaries of the specific range. A range defined in this manner may include an end value or may not include an end value, and may be any combination, that is, any lower limit may be combined with any upper limit to form a range. For example, if the ranges of 60-120 and 80-110 are listed for a specific parameter, it is understood that the ranges of 60-110 and 80-120 are also expected. In addition, if the minimum range values of 1 and 2 are listed, and if the maximum range values of 3, 4, and 5 are listed, the following ranges may all be expected: 1-3, 1-4, 1-5, 2-3, 2-4, and 2-5. In the present application, unless otherwise specified, a numerical range "a-b" represents an abbreviated representation for a combination of any real numbers between a and b, where both a and b are real numbers. For example, the numerical range of "0-5" represents that all real numbers between "0-5" have been listed herein, and "0-5" is only a shortened representation of these numerical combinations. In addition, when a parameter is expressed as an integer ≥2, it is equivalent to disclosing that the parameter is an integer such as 2, 3, 4, 5, 6, 7, 8, 9, 10, 11, or 12.

In the descriptions of the present application, it should be noted that, unless otherwise noted, "a plurality of" means two or more; and an orientation relationship or a position relationship indicated by terms "upper", "lower", "left", "right", "inside", and "outside" is merely for ease of describing the present application and simplifying the description, rather than indicating or implying that a specified apparatus or element necessarily has a specific orientation or is constructed and operated in a specific orientation. Therefore, the terms should not be construed as a limitation on the present application. In addition, the terms "first", "second", "third", and the like are used merely for description purposes, and should not be understood as an indication or implication of relative importance.

Unless otherwise stated, in the present application, the phrase "A and/or B" means "A, B, or both A and B". More specifically, the condition "A and/or B" is satisfied by either A being true (or present) and B being false (or absent), A being false (or absent) and B being true (or present), or both A and B being true (or present).

Unless otherwise specified, all steps in the present application may be performed sequentially or randomly, preferably sequentially. For example, the method includes steps (a) and (b), which indicates that the method may include sequentially performed steps (a) and (b) or may include sequentially performed steps (b) and (a). For example, the mentioned method may further include step (c), which indicates that step (c) may be added to the method in any order, for example, the method may include steps (a), (b), and (c), may include steps (a), (c), and (b), may include steps (c), (a) and (b), or the like.

Unless otherwise specified, all embodiments and optional embodiments of the present application may be combined with each other to form new technical solutions.

Unless otherwise specified, the following terms have the following meanings. Any undefined terms have their technically recognized meanings.

As mentioned, "CB (Cell balance) value" refers to the ratio of the capacity of a positive electrode to the capacity of a negative electrode on the opposite sides of the battery, and is also referred to as the N/P (Negative/Positive) ratio. In other words, the CB value is equal to the ratio of the capacity of the negative electrode active material per unit area to the capacity of the positive electrode active material per unit area.

As mentioned, "low CB value region" refers to a region in the battery where the CB value is less than 1.

As mentioned, the "high CB value region" refers to a region in the battery where the CB value is 1 or more.

As mentioned, "$\varphi(Li^+/Li)$" refers to the standard electrode potential of a lithium ion. The standard electrode potential of a substance refers to an electrode potential of the substance measured when the substance forms a galvanic cell with a standard hydrogen electrode. For example, the standard electrode potential of lithium relative to hydrogen is −3.04 V. In the present application, the electrode potential is also referred to as a reduction potential.

As mentioned, "3 V vs. Li$^+$/Li" means that the electrode potential is 3 v with respect to the lithium electrode with lithium as the counter electrode.

Next, embodiments of the present application will be described.

In recent years, secondary batteries have been widely used in various fields such as electric tools, electronic products, electric vehicles, and aerospace due to their high energy density and long service life, and thus have been developed. Generally, a secondary battery includes a positive electrode plate, a negative electrode plate, an electrolyte and a separator element. During charging and discharging of a battery, active ions are intercalated into and deintercalated from the positive electrode plate and the negative electrode plate back and forth. The electrolyte functions to conduct active ions between the positive electrode plate and the negative electrode plate. The separator element is disposed between the positive electrode plate and the negative electrode plate to allow active ions to pass therethrough while preventing a short circuit between the positive and negative electrodes, enabling the normal electrochemical reaction of the secondary battery.

Taking a lithium-ion battery as an example, a lithium-ion battery is a typical secondary battery. Since it relies on the electrochemical reaction of lithium ions being deintercalated and intercalated between the positive and negative electrodes for charging and discharging, a lithium-ion battery is also known as a rocking-chair battery. During the charging of a lithium-ion battery, lithium ions are deintercalated from the positive electrode active material, move to the negative electrode through the conduction of the electrolyte, and are intercalated into the negative electrode active material; while during the discharging process, lithium ions are deintercalated from the negative electrode active material, move to the positive electrode through the conduction of the electrolyte, and are intercalated into the positive electrode active material.

It should be understood that the "lithium intercalation" and "intercalation" processes described in the present application refer to the process in which lithium ions are intercalated into the positive electrode active material or the negative electrode active material due to an electrochemical reaction. The "deintercalation", "lithium deintercalation" and "extrication" processes described in the present application refer to the process in which lithium ions are deintercalated from the positive electrode active material or the negative electrode active material due to an electrochemical reaction.

During the production of a lithium-ion battery, the slurry containing the active material needs to be coated on the current collector to form an electrode plate. Due to the limitations of factors such as the coating process and the different drying speeds of the slurry at different positions on the electrode plate after coating, it is usually impossible to obtain an electrode plate with a completely uniform thickness. This results in the appearance of a low CB value region in the lithium-ion battery. During the cycling process of the lithium-ion battery, since the capacity of the negative electrode plate corresponding to the low CB value region is relatively low, it cannot completely accommodate the lithium ions deintercalated from the positive electrode plate corresponding to the low CB value region, causing the excess lithium ions to be unable to intercalate into the negative electrode active material, resulting in the phenomenon of lithium deposition. With the further deposition of lithium ions, the growth of lithium dendrites continuously consumes active lithium ions, resulting in a decrease in the capacity and cycle life of the battery.

In view of this, embodiments of the present application provide a lithium-ion battery and an electric device. The electrolyte of the lithium-ion battery includes a metal ion, which can improve lithium deposition and inhibit the growth of lithium dendrites during the cycling process of the lithium-ion battery, and help to increase the capacity retention rate and cycling performance of the lithium-ion battery.

Generally, a lithium-ion battery includes a positive electrode plate, a negative electrode plate, an electrolyte and a separator element. Next, the lithium-ion battery provided in the present application and each part of the lithium-ion battery will be described.

First, a lithium-ion battery is provided, including: an electrolyte including a metal ion, where a reduction potential of the metal ion is higher than a reduction potential of a lithium ion; and a low CB value region, where a CB value of the lithium-ion battery in the low CB value region satisfies: $0<CB<1$, and the CB value is a ratio of a capacity of a negative electrode active material per unit area to a capacity of a positive electrode active material per unit area.

Specifically, the CB value of the low CB value region may be any value between 0 and 1, or within the range obtained by any combination of two values between 0 and 1. In the low CB value region of the lithium-ion battery, since the CB value is less than 1, lithium deposition easily occurs during the cycling process. FIG. 1 is a schematic diagram of the principle for suppressing lithium deposition in a lithium-ion battery provided in an embodiment of the present application.

As shown in FIG. 1, the negative electrode plate 1 includes a negative current collector 11 and a negative electrode active material layer 12 disposed on the negative current collector 11. After the lithium-ion battery is formed, the negative electrode plate 1 also includes a solid electrolyte interface (SEI) film 13 formed on the surface of the negative electrode active material layer 12. A region a corresponds to a low CB value region, and a region b corresponds to a high CB value region. As lithium deposition continuously occurs in the low CB value region, a lithium dendrite 14 grows and thus pierces the SEI film 13.

In this embodiment, by introducing the metal ion with a reduction potential higher than that of lithium ions into the lithium-ion battery, the metal ion can be reduced by lithium. Thus, once the lithium dendrite grows and pierces the SEI film, the free metal ions in the electrolyte will move to the lithium dendrite and be reduced to metal simple substances by the deposited lithium. The metal simple substances can further form an alloy with lithium, thereby suppressing lithium deposition and helping to improve the capacity retention rate and cycling performance of the lithium-ion battery.

Figure 2:
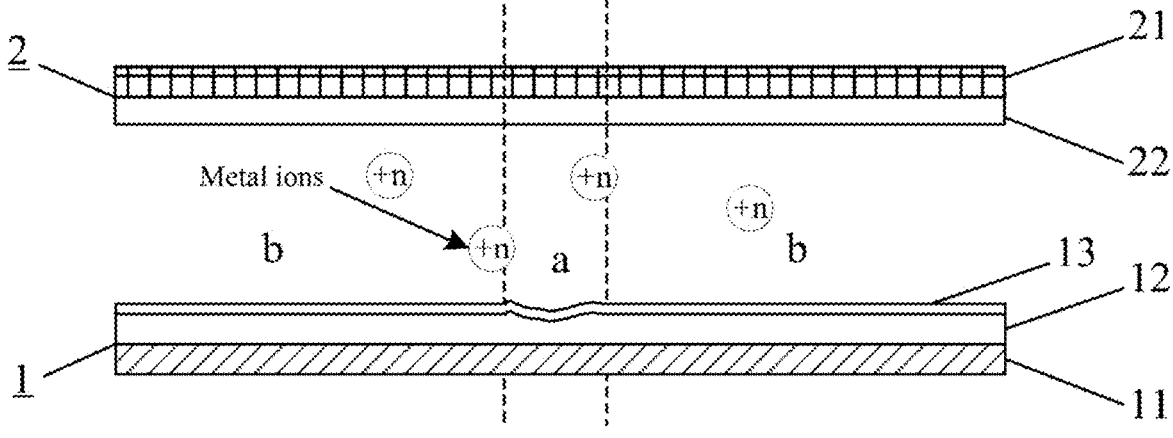
FIG. 2 is a schematic diagram of a low CB value region.

It should be understood that the low CB value region a in FIG. 1 is only an example of a low CB value region, which shows a situation where the thickness of the negative electrode active material layer 12 on the negative electrode plate 1 is uniform, but due to the relatively thick active material layer on the positive electrode plate (not shown in the figure), this position becomes the low CB value region a. FIG. 2 shows another example of forming the low CB value region a. As shown in FIG. 2, the positive electrode plate 2 includes a positive current collector 21 and a positive electrode active material layer 22 disposed on the positive current collector 21. When the thickness of the positive electrode active material layer 22 is uniform, a relatively thin thickness of the negative electrode active material layer will also cause this position to become the low CB value region a.

In another possible situation, the thicknesses of both the positive electrode active material layer and the negative electrode active material layer at a certain position are non-uniform. For example, when the positive electrode active material layer is relatively thick and the negative electrode active material layer is relatively thin at the same time, this position may also become the low CB value region a.

In one embodiment, the lithium-ion battery includes a negative electrode plate, where a percentage X of an area of the negative electrode plate corresponding to the low CB value region in an area of the negative electrode plate satisfies: 0%<X; optionally, 0%<X≤10%; and optionally, 0%<X≤2%.

Specifically, X may be 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, or a value within a range obtained by combining any two of the above values.

The low CB value region is generated due to process limitations in the production process of the lithium-ion battery, and thus, generally, 0%<X. On the other hand, based on the existing production process of lithium-ion batteries, the area of the low CB value region will not be infinitely large. Considering factors such as the product yield of lithium-ion batteries, the value of X also needs to satisfy: X≤10%. It should be understood that generally, the smaller the area of the low CB value region, the smaller X is, and the smaller the region on the negative electrode plate where lithium deposition or lithium dendrite growth is likely to occur, which is more conducive to the product yield of lithium-ion batteries.

In one example, since lithium deposition is extremely likely to occur at the position of the negative electrode plate corresponding to the low CB value region. Therefore, by disassembling the cycled lithium-ion battery, the area of the lithium deposition region on the negative electrode plate can be measured and approximated as the area of the negative electrode plate corresponding to the low CB value region. In another example, for the convenience of testing, a part of the low CB value region can also be artificially created during the preparation of the lithium-ion battery, so that the area of this part of the low CB value region can be artificially controlled and adjusted. During the testing, the CB value of the specified region of the positive electrode plate and the negative electrode plate can be calculated by measuring the capacity of the specified region, and thus, it can be determined whether this region is a low CB value region.

In one embodiment, the CB value of the lithium-ion battery in the low CB value region satisfies: 0.5<CB<1.

Specifically, the CB value in the low CB value region may be any value between 0.5 and 1, or within the range obtained by any combination of two values between 0.5 and 1.

In one embodiment, a reduction potential $\varphi(M^{n+}/M)$ of the metal ion satisfies: $\varphi(M^{n+}/M)+(RT\ln C)/F \geq \varphi(Li^+/Li)$.

$M^{n+}$ represents the metal ion, n represents a valence of the metal ion, C represents a molar concentration of the metal ion in the electrolyte, R represents an ideal gas constant, T represents a temperature, F represents the Faraday constant, and $\varphi(Li^+/Li)$ represents a standard electrode potential of the lithium ion. Generally, R is equal to 8.314 $J·K^{-1}·mol^{-1}$, a unit of T is K, and F is equal to 96485 $C·mol^{-1}$.

In one embodiment, the reduction potential $\varphi(M^{n+}/M)$ of the metal ion satisfies: $\varphi(M^{n+}/M)+(RT\ln C)/F \leq 3$ V vs. $Li^+/Li$.

In this embodiment, by selecting a metal ion whose reduction potential satisfies the above conditions, when the reduction potential of the metal ion is higher than that of lithium ions and the metal ion can be reduced by lithium; by controlling the upper limit of the reduction potential of the metal ion, metal ion with relatively weak oxidizing properties can be selected, thereby reducing the influence of the metal ion on the electrolyte, the positive electrode plate and the negative electrode plate.

In one embodiment, the molar concentration C of the metal ion in the electrolyte satisfies: 0.001 M≤C≤1 M; and optionally, 0.001 M≤C≤0.2 M.

Specifically, C may be 0.001 M, 0.002 M, 0.003 M, 0.004 M, 0.005 M, 0.006 M, 0.007 M, 0.008 M, 0.009 M, 0.01 M, 0.02 M, 0.03 M, 0.04 M, 0.05 M, 0.06 M, 0.07 M, 0.08 M, 0.09 M, 0.1 M, 0.2 M, 0.3 M, 0.4 M, 0.5 M, 0.6 M, 0.7 M, 0.8 M, 0.9 M, 1 M, or a value within a range obtained by combining any two of the above values.

On the one hand, if the molar concentration of the metal ions in the electrolyte is too low, its inhibitory effect on lithium dendrites is limited, and it is impossible to achieve continuous inhibition of lithium dendrites during the long cycling process of the lithium-ion battery. On the other hand, if the molar concentration of the metal ions in the electrolyte is too high, too many metal ions are reduced by lithium, there is too much metal on the surface of the negative electrode plate, and the insulating performance of the SEI film decreases, resulting in an increase in the self-discharge of the lithium-ion battery.

Thus, in this embodiment, by controlling the concentration of the metal ions in the electrolyte within an appropriate range, while inhibiting lithium dendrites, the influence of the reduced metal ions on the insulating performance of the SEI film can be reduced, thereby helping to reduce the self-discharge of the lithium-ion battery.

In one embodiment, the metal ion includes at least one of $Mg^{2+}$, $Al^{3+}$, $Zn^{2+}$ and $Sb^{2+}$.

It will be appreciated that the metal ion may be provided by a salt that can dissolve in the electrolyte. Taking the magnesium ion as an example, the magnesium ion can be introduced by adding magnesium nitrate to the electrolyte. The metal salt includes an anion, and illustratively, the anion may be an acetate ion, a nitrate ion, a hexafluorophosphate ion, a bisfluorosulfonylimide ion.

In the above embodiment, a lithium-ion battery capable of suppressing lithium dendrites for a long period of time has been described. Next, the lithium-ion battery after cycling of the above lithium-ion battery will be described.

Embodiments of the present disclosure further provide a lithium-ion battery after cycling, including: a low CB value region, where a CB value of the lithium-ion battery in the low CB value region satisfies: 0.5<CB<1; and a negative electrode plate, where a content of a metal element per unit area at the negative electrode plate corresponding to the low CB value region is greater than a content of a metal element at the negative electrode plate corresponding to a high CB value region, where a CB value of the lithium-ion battery in the high CB value region satisfies: CB≥1; the CB value is a ratio of a capacity of a negative electrode active material to a capacity of a positive electrode active material; and a reduction potential of a metal ion corresponding to the metal element is higher than a reduction potential of a lithium ion.

It should be understood that in the embodiment of the present application, the lithium-ion battery after cycling can be regarded as a lithium-ion battery in which the phenomenon of lithium deposition has already occurred, that is, a lithium-ion battery after lithium deposition. It has been mentioned in the previous embodiments that the electrolyte of the lithium-ion battery includes a metal ion. Therefore, in the lithium-ion battery after cycling, lithium deposition occurs at the negative electrode plate corresponding to the low CB value region, and the deposited lithium is consumed by the metal ion, so that in the cycled lithium-ion battery, the content of the metal element per unit area at the negative electrode plate corresponding to the low CB value region is greater than the content of the metal element per unit area at the negative electrode plate corresponding to the high CB value region.

In one embodiment, a percentage X of an area of the negative electrode plate corresponding to the low CB value region in an area of the negative electrode plate satisfies: $0\% < X$; optionally, $0\% < X \leq 10\%$; and optionally, $0\% < X \leq 2\%$.

In one embodiment, the CB value of the lithium-ion battery in the low CB value region satisfies: $0.5 < CB < 1$.

In one embodiment, the metal element includes at least one of Mg, Al, Zn and Sb.

In one embodiment, the lithium-ion battery includes: an electrolyte including a metal ion, where the metal ion is an ion corresponding to the metal element.

Specifically, as the number of charge-discharge cycles of the lithium-ion battery increases, the metal ion in the electrolyte is consumed by the deposited lithium, and thus, the concentration of the metal ion gradually decreases. Thus, in a lithium-ion battery after cycling, the electrolyte may also include some metal ions that have not been reduced by lithium.

In one embodiment, a molar concentration $C'$ of the metal ion in the electrolyte satisfies: $0 \, M \leq C' < 0.2 \, M$.

It should be understood that the metal ions may be completely consumed or may partially remain in the lithium-ion battery after cycling, and thus $C'$ may be 0 or may not be 0. Specifically, $C'$ may be 0 M, 0.02 M, 0.04 M, 0.06 M, 0.08 M, 0.1 M, 0.12 M, 0.14 M, 0.16 M, 0.18 M, 0.2 M, or a value within a range obtained by combining any two of the above values.

Next, the positive electrode plate, the negative electrode plate, the separator element and the electrolyte in the lithium-ion battery will be described in detail.

[Negative Electrode Plate]

The negative electrode plate generally includes a negative current collector and a negative electrode active material layer disposed on at least one surface of the negative current collector.

As an example, the negative current collector has two surfaces opposite to each other in its own thickness direction, and the negative electrode active material layer is disposed on either one or both of the two opposite surfaces of the negative current collector.

In one embodiment, for the negative current collector, a metal foil sheet or a composite current collector may be employed. For example, a copper foil may be used as the metal foil. The composite current collector may include a polymer material base layer and a metal layer formed on at least one surface of a polymer material substrate. The composite current collector may be formed by forming a metal material (copper, a copper alloy, nickel, a nickel alloy, titanium, a titanium alloy, silver, a silver alloy, or the like) on the polymer material substrate (e.g., a substrate of polypropylene (PP), polyethylene terephthalate (PET), polybutylene terephthalate (PBT), polystyrene (PS), or polyethylene (PE)).

In one embodiment, the negative electrode active material may be a negative electrode active material for a battery known in the art. As an example, the negative electrode active material may include at least one of the following materials: synthetic graphite, natural graphite, soft carbon, hard carbon, a silicon-based material, a tin-based material, lithium titanate, and the like. The silicon-based material may be selected from at least one of elemental silicon, a silicon-oxygen compound, a silicon-carbon composite, a siliconnitrogen composite, and a silicon alloy. The tin-based material may be selected from at least one of elemental tin, a tin-oxygen compound, and a tin alloy. However, the present application is not limited to these materials, and another conventional material that can be used as a negative electrode active material of a battery may also be used. These negative electrode active materials may be used alone or in combination of two or more thereof.

In one embodiment, the negative electrode active material layer further includes a binder. The binder may be selected from at least one of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In one embodiment, the negative electrode active material layer further includes a conductive agent. The conductive agent may be selected from at least one of superconducting carbon, acetylene black, carbon black, Ketjen black, carbon dots, carbon nanotubes, graphene, and carbon nanofibers.

In one embodiment, the negative electrode active material layer further includes other additives, such as a thickening agent (e.g., sodium carboxymethyl cellulose (CMC-Na)).

In one embodiment, the negative electrode plate can be prepared in the following way: the components used for preparing the negative electrode plate are formed into a negative electrode slurry. For example, the negative electrode active material, the conductive agent, the binder and any other components are dispersed in a solvent (e.g., N-methylpyrrolidone) to form a negative electrode slurry. Then, the negative electrode slurry is coated on the negative current collector. After processes such as drying and cold pressing, the negative electrode plate can be obtained.

[Positive Electrode Plate]

The positive electrode plate includes a positive current collector and a positive electrode active material layer disposed on at least one surface of the positive current collector.

As an example, the positive current collector has two surfaces opposite to each other in its own thickness direction, and the positive electrode active material layer is disposed on either one or both of the two opposite surfaces of the positive current collector.

In one embodiment, for the positive current collector, a metal foil sheet or a composite current collector may be employed. For example, an aluminum foil can be used as the metal foil. The composite current collector may include a polymer material base layer and a metal layer formed on at least one surface of the polymer material base layer. The composite current collector may be formed by forming a metal material (aluminum, an aluminum alloy, nickel, a nickel alloy, titanium, a titanium alloy, silver, a silver alloy, and the like) on a base material of a polymer material such as a base material of polypropylene (PP), polyethylene terephthalate (PET), polybutylene terephthalate (PBT), polystyrene (PS), polyethylene (PE), and the like.

In one embodiment, the positive electrode active material may be a positive electrode active material for a battery known in the art. As an example, the positive electrode active material may include at least one of olivine-structured lithium-containing phosphate, lithium-transition metal oxide, and their respective modifying compounds. However, the present application is not limited to these materials, and other conventional materials that can be used as a positive electrode active material of a battery may also be used. These positive electrode active materials may be used alone or in combination of two or more thereof. Examples of the lithium transition metal oxide may include, but are not limited to, at least one of lithium cobalt oxide (e.g., $LiCoO_2$), lithium nickel oxide (for example, $LiNiO_2$), lithium manganese oxide (e.g., $LiMnO_2$ or $LiMn_2O_4$), lithium nickel cobalt oxide, lithium manganese cobalt oxide, lithium nickel manganese oxide, lithium nickel cobalt manganese oxide (e.g., $LiNi_{1/3}Co_{1/3}Mn_{1/3}O_2$ (also simply referred to as NCM333), $LiNi_{0.5}Co_{0.2}Mn_{0.3}O_2$ (also simply referred to as NCM523), $LiNi_{0.5}Co_{0.25}Mn_{0.25}O_2$ (also simply referred to as NCM211), $LiNi_{0.6}Co_{0.2}Mn_{0.2}O_2$ (also simply referred to as NCM622), $LiNi_{0.8}CO_{0.1}Mn_{0.1}O_2$ (also simply referred to as NCM811)), lithium nickel cobalt aluminum oxide (e.g., $LiNi_{0.85}Co_{0.15}Al_{0.05}O_2$), modified compounds thereof, and the like. Examples of the olivine-structured lithium-containing phosphate may include, but are not limited to, at least one of lithium iron phosphate (e.g., $LiFePO_4$ (which may also be simply referred to as LFP)), a composite of lithium iron phosphate and carbon, lithium manganese phosphate (e.g., $LiMnPO_4$), a composite material of lithium manganese phosphate and carbon, lithium ferro-manganese phosphate, and a composite material of lithium ferro-manganese phosphate and carbon. Deintercalation and consumption of Li occur during charging and discharging of the battery, and the molar content of Li in the positive electrode active material varies when the battery is discharged to different states. In the enumeration of the positive electrode active material in the present application, the molar content of Li is an initial state of the material, i.e., a state before adding. The positive electrode active material is applied to a battery system, and the molar content of Li changes after charging and discharging cycles. In the enumeration of the positive electrode active material in the present application, the molar content of O is only an ideal state value, the molar content of O changes due to the release of oxygen from a lattice, and the actual molar content of O fluctuates.

In one embodiment, the positive electrode active material layer further includes a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In one embodiment, the positive electrode active material layer further includes a conductive agent. As an example, the conductive agent may include at least one of superconducting carbon, acetylene black, carbon black, ketjen black, carbon dots, carbon nanotubes, graphene, and carbon nanofibers.

In one embodiment, the positive electrode plate can be prepared in the following manner: The components used for preparing the positive electrode plate are respectively used to form a positive electrode slurry. For example, the first positive electrode active material and/or the second positive electrode active material, the conductive agent, the binder, and any other components are dispersed in a solvent (such as N-methylpyrrolidone) to form a positive electrode slurry. Then, the positive electrode slurry is coated on the positive current collector. After processes such as drying and cold-pressing, the positive electrode plate can be obtained.

[Electrolyte]

The electrolyte functions to conduct ions between the positive electrode plate and the negative electrode plate. The type of the electrolyte is not specifically limited in the present application, and may be selected according to a requirement. The electrolyte includes an electrolyte salt, a solvent and metal ions, and the reduction potential of these metal ions is higher than that of lithium ions.

In one embodiment, the electrolyte salt may be selected from at least one of lithium hexafluorophosphate, lithium tetrafluoroborate, lithium perchlorate, lithium hexafluoroarsenate, lithium bisfluorosulfonylimide, lithium bistrifluoromethanesulfonylimide, lithium trifluoromethanesulfonate, lithium difluorophosphate, lithium difluorooxalatoborate, lithium dioxalatoborate, lithium difluorodioxalatophosphate, and lithium tetrafluorooxalatophosphate.

In one embodiment, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In one embodiment, the metal ion includes at least one of $Mg^{2+}$, $Al^{3+}$, $Zn^{2+}$ and $Sb^{2+}$.

In one embodiment, the metal ions are provided by inorganic salts. In other words, the electrolyte includes an inorganic salt, and the inorganic salt includes the metal ions and anions. Illustratively, the anions include at least one of acetate, nitrate, hexafluorophosphate and perchlorate.

In one embodiment, a reduction potential $\varphi(M^{n+}/M)$ of the metal ion satisfies: $\varphi(M^{n+}/M)+(RT\ln C)/F \geq \varphi(Li^+/Li)$, where $M^{n+}$ represents the metal ion, n represents a valence of the metal ion, C represents a molar concentration of the metal ion in the electrolyte, R represents an ideal gas constant, T represents a temperature, F represents the Faraday constant, and $\varphi(Li^+/Li)$ represents a standard electrode potential of the lithium ion.

In one embodiment, the reduction potential $\varphi(M^{n+}/M)$ of the metal ion satisfies: $\varphi(M^{n+}/M)+(RT\ln C)/F \leq 3$ V vs. $Li^+/$Li.

In one embodiment, in the lithium-ion battery before cycling, the molar concentration C of the metal ion in the electrolyte satisfies: 0.001 M$\leq$C$\leq$1 M; optionally, 0.001 M$\leq$C$\leq$0.2 M.

In one embodiment, in the lithium-ion battery after cycling, the molar concentration C' of the metal ion in the electrolyte satisfies: 0 M$\leq$C'$<$0.2 M.

In one embodiment, the electrolyte may further include an additive. The additive may include a negative electrode film-forming additive, a positive electrode film-forming additive, and may further include an additive capable of improving specific performance of the battery, for example, an additive improving overcharge performance of the battery, an additive improving high-temperature or low-temperature performance of the battery, and the like.

[Separator Element]

In one embodiment, the battery further includes a separator element. The type of the separator element is not particularly limited in the present application. For example, any well-known porous separator with good chemical stability and mechanical stability may be used.

In one embodiment, a material of the separator may be selected from at least one of glass fibers, nonwoven fabrics, polyethylene, polypropylene, and polyvinylidene fluoride. The separator may be a single-layer thin film or may be a multi-layer composite thin film, which is not particularly limited. When the separator is a multi-layer composite thin film, materials of each layer may be the same or different, which is not particularly limited.

In some embodiments, the positive electrode plate, the negative electrode plate and the separator element may be manufactured into the electrode assembly through a winding process or a lamination process.

In one embodiment, the battery cell may include an outer package. The outer package may be used to encapsulate the electrode assembly and the electrolyte described above.

In one embodiment, the outer package of the battery cell may be a hard shell, such as a hard plastic shell, an aluminum shell, a steel shell, etc. The outer package of the battery cell may also be a pouch, such as a bag-type pouch. The material of the pouch may be plastic, and examples of the plastic include polypropylene, polybutylene terephthalate, and polybutylene succinate.

Figure 3:
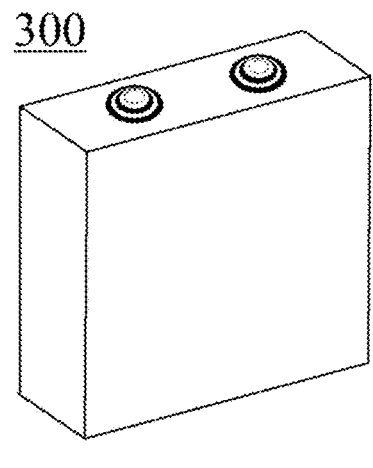
FIG. 3 is a schematic diagram of a battery cell.

The shape of the battery cell is not particularly limited in the present application, and may be a cylindrical shape, a square shape, or any other shape. For example, FIG. 3 shows a battery cell 300 with a square structure as an example.

It should be understood that the battery cell 300 may include the lithium-ion battery in the previous embodiments.

Figure 4:
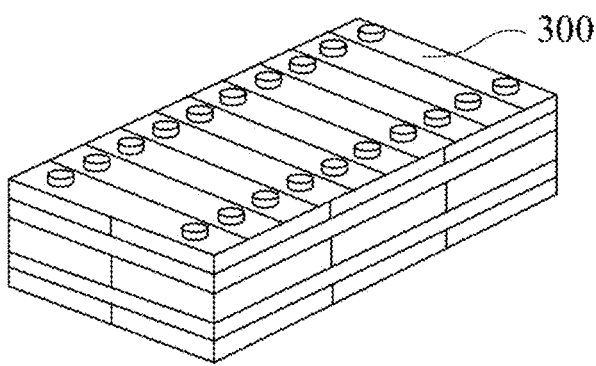
FIG. 4 is a schematic diagram of a battery module.

FIG. 4 shows a battery module 400 as an example. Referring to FIG. 4, in the battery module 400, a plurality of battery cells 300 may be arranged sequentially in the length direction of the battery module 400. Certainly, the secondary batteries may alternatively be arranged in any other manner. Further, the plurality of battery cells 300 may be fastened by using fasteners. The plurality of battery cells 300 may be battery cells 300 of the same chemical system or battery cells 300 of different chemical systems.

Optionally, in one embodiment, the battery module 400 may further include a housing having an accommodating space in which the plurality of battery cells 300 are accommodated.

Optionally, in one embodiment, the above battery module 400 may also be assembled into a battery. The number of battery modules 400 included in the battery can be one or more. Those skilled in the art can specifically select the number according to the application and capacity of the battery.

Figure 5:
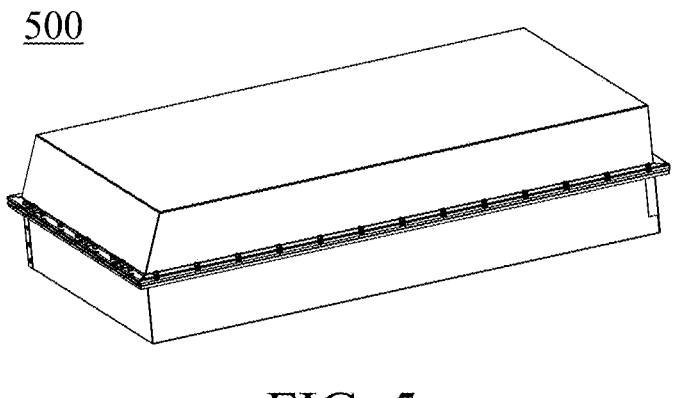
FIG. 5 is a schematic diagram of a battery.
Figure 6:
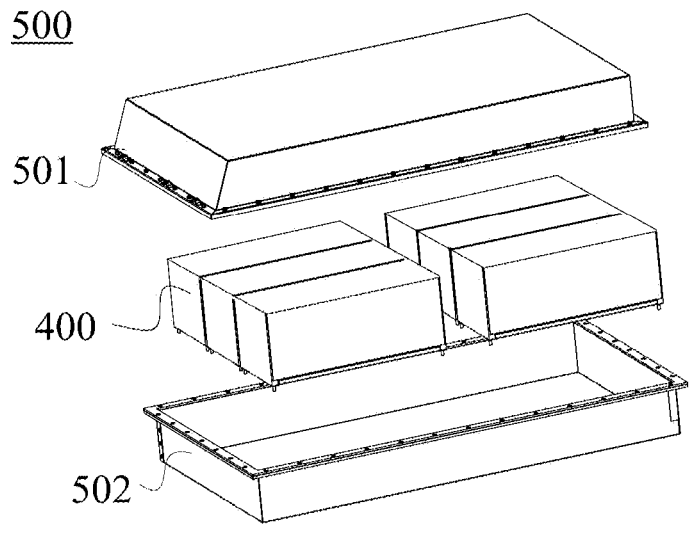
FIG. 6 is another schematic diagram of a battery.

FIG. 5 and FIG. 6 show a battery 500 as an example. Referring to FIG. 5 and FIG. 6, a battery case and a plurality of battery modules 400 disposed in the battery case may be included in the battery 500. The battery case includes an upper case 501 and a lower case 502, the upper case 501 being capable of covering the lower case 502 and forming a closed space for accommodating the battery modules 400. The plurality of battery modules 400 may be arranged in any manner in the battery box.

It should be understood that in some other embodiments, the above battery 500 is also referred to as a battery pack. The battery cells 300 may be first assembled into a battery module 400, and the battery 500 may be assembled from the battery module 400. The battery 500 may also be formed directly from the battery cells 300, and the intermediate form of the battery module 400 may be omitted.

In addition, the present application also provides an electric device, including the lithium-ion battery in the previous embodiments.

In another embodiment, the electric device includes at least one of the battery cell 300, the battery module 400 or the battery 500 provided in the present application. The battery cell 300, the battery module 400 or the battery 500 may be used as the power source of the electric device, or may be used as the energy storage unit of the electric device. The electric apparatus may include, but is not limited to, a mobile device (e.g., a cell phone or a notebook computer), an electric vehicle (e.g., a battery electric vehicle, a hybrid electric vehicle, a plug-in hybrid electric vehicle, an electric bicycle, an electric scooter, an electric golf cart, or an electric truck), an electric train, ship, or satellite, or an energy storage system.

As an electric device, the battery cell 300, the battery module 400 or the battery 500 can be selected according to its use requirements.

An electric device is taken as an example. The electric device is a pure electric vehicle, a hybrid electric vehicle, a plug-in hybrid electric vehicle, or the like. In order to meet the demand for high power and high energy density of the secondary battery by the electric device, a battery pack or a battery module may be used.

In another example, the apparatus may be a cell phone, a tablet computer, a notebook computer, or the like. This electric device is generally required to be thin and lightweight, and may use a secondary battery as a power supply.

Embodiments of the present application are described below. The examples described below are illustrative only and are not to be construed as limiting the present application. In the embodiments, specific techniques or conditions are not indicated, and they are performed according to techniques or conditions described in documents in the art or according to the specification of the product. The reagents or instruments used without specifying the manufacturer(s) are conventional products that are commercially available.

Examples 1-10 and Comparative Example 1

Example 1

(1) Preparation of Negative Electrode Plate

Artificial graphite (1 kg, particle diameter 15 μm) as a negative electrode active material, acetylene black (10 g) as a conductive agent, styrene-butadiene rubber (30 g) as a binder, and sodium carboxymethyl cellulose (20 g) as a thickener were dissolved in deionized water (1 kg) as a solvent, and uniformly mixed to obtain a negative electrode slurry. Subsequently, the negative electrode slurry was uniformly coated on a copper foil as a negative electrode current collector. After drying, rolling and slitting, a negative electrode plate is obtained.

(2) Preparation of Positive Electrode Plate $LiNi_5Co_2Mn_3O_2$ (1 kg) as a positive electrode active material, carbon nanotubes (20 g) as a conductive agent, and polyvinylidene fluoride (20 g) as a binder were dissolved in N-methylpyrrolidone (1 kg) as a solvent, and uniformly mixed to obtain a positive electrode slurry. The positive electrode slurry was then uniformly coated on an aluminum foil as a positive electrode current collector. After drying, rolling and slitting, a positive electrode plate was obtained.

(3) Preparation of Electrolyte

In an argon atmosphere glove box (with $H_2O<0.1$ ppm and $O_2<0.1$ ppm), electrolytes E1 and E2 were prepared. E1 was used for the first injection of the lithium-ion battery, and E2 was used for the secondary injection after the formation of the lithium-ion battery. In the lithium-ion battery after formation, the volume ratio of E1 to E2 was 4:1.

Preparation of electrolyte E1: the organic solvents ethylene carbonate (EC), dimethyl carbonate (DMC) and diethyl carbonate (DEC) were mixed uniformly according to the volume ratio of 1:1:1. Then, 1.25 M lithium hexafluorophosphate ($LiPF_6$) was added and dissolved in the solvent, and the mixture was stirred uniformly to obtain the electrolyte E1.

Preparation of electrolyte E2: the organic solvents ethylene carbonate (EC), dimethyl carbonate (DMC), and diethyl carbonate (DEC) were mixed uniformly according to the volume ratio of 1:1:1. Then, 0.25 M magnesium bis (trifluoromethanesulfonyl) imide was added and dissolved in the solvent, and the mixture was stirred uniformly to obtain the electrolyte E2.

(4) Preparation of Lithium-Ion Battery

The positive electrode plate, the separator membrane, and the negative electrode plate were stacked in sequence so that the separator membrane was positioned between the positive electrode plate and the negative electrode plate and could isolate them. Then, the stacked components were wound and placed in the casing. After drying, the electrolyte E1 was injected.

The above battery was formed. The specific formation conditions were as follows: Using a LAND battery test system, the positive electrode and the negative electrode were connected, and the battery was left to stand for 1 minute. It was then charged at a constant current of 0.33 C to 4.2 V, followed by constant-voltage charging at 4.2 V until the cut-off current reached 0.05 C. After that, it was left to stand for 10 minutes, then discharged at a constant current of 0.33 C until the cut-off voltage reached 2.5 V, and finally left to stand for 50 hours. The SEI film was formed during the formation of the battery, which helped to reduce the polarization of the battery.

A secondary injection was performed on the formed battery, and electrolyte E2 was injected into the battery. After encapsulation, the lithium-ion battery was obtained.

The lithium-ion battery in Example 1 was tested. The area S1 of the negative electrode plate corresponding to the low CB value region accounted for 5% of the total area S of the negative electrode plate, that is, S1/S=5%. The CB value of the low CB value region was 0.95, the CB value of the high CB value region was 1.1, the concentration of lithium ions in the electrolyte was 1 M, the molar concentration C of magnesium ions was 0.05 M, and the reduction potential of magnesium ions was 0.59 V vs. $Li^+/Li$.

Example 2

Compared with the lithium-ion battery in Example 1, in the lithium-ion battery of Example 2, S1/S=0.1%.

Example 3

Compared with the lithium-ion battery in Example 1, in the lithium-ion battery of Example 3, S1/S=10%.

Example 4

Compared with the lithium-ion battery in Example 1, in the lithium-ion battery of Example 4, the CB value of the low CB value region was 0.9.

16

Example 5

Compared with the lithium-ion battery in Example 1, in the lithium-ion battery of Example 5, the CB value of the low CB value region was 0.8.

Example 6

Compared with the lithium-ion battery in Example 1, in the lithium-ion battery of Example 6, the CB value of the low CB value region was 0.7.

Example 7

Compared with the lithium-ion battery in Example 1, in the lithium-ion battery of Example 7, the CB value of the low CB value region was 0.5.

Example 8

Compared with the lithium-ion battery in Example 1, in the lithium-ion battery of Example 8, C=0.001 M.

Example 9

Compared with the lithium-ion battery in Example 1, in the lithium-ion battery of Example 9, C=0.2 M.

Example 10

Compared with the lithium-ion battery in Example 1, the metal ions in the electrolyte of the lithium-ion battery of Example 10 were aluminum ions, the molar concentration of aluminum ions C=0.05 M, and the reduction potential of aluminum ions was.

Comparative Example 1

Compared with the lithium-ion battery in Example 1, the electrolyte of the lithium-ion battery in Comparative Example 1 did not include metal ions. The process of preparing an electrolyte E2 in Comparative Example 1 was as follows: in an argon atmosphere glove box (with $H_2O<0.1$ ppm and $O_2<0.1$ ppm), the organic solvents ethylene carbonate (EC), dimethyl carbonate (DMC) and diethyl carbonate (DEC) were mixed uniformly at a volume ratio of 1:1:1 to obtain the electrolyte E2.

The product parameters and performance test parameters of Examples 1-10 and Comparative Example 1 are detailed in Table 1.

TABLE 1

| Product and performance parameters of Examples 1-10 and Comparative Example 1 | | | | | | | |
|---|---|---|---|---|---|---|---|
| Metal ion | S1/S | CB value | C (M) | m1/m2 | C' (M) | Capacity retention rate after 500 cycles (%) | Self-discharge of the lithium-ion battery (mV/h) |
| Example 1 | $Mg^{2+}$ | 5% | 0.95 | 0.05 | 32 | 0.02 | 89.4% | 0.08 |
| Example 2 | $Mg^{2+}$ | 0.1% | 0.95 | 0.05 | 31 | 0.04 | 92.1% | 0.02 |
| Example 3 | $Mg^{2+}$ | 10% | 0.95 | 0.05 | 33 | 0.009 | 85.9% | 0.11 |
| Example 4 | $Mg^{2+}$ | 5% | 0.9 | 0.05 | 64 | 0.016 | 89.1% | 0.13 |
| Example 5 | $Mg^{2+}$ | 5% | 0.8 | 0.05 | 129 | 0.011 | 86.4% | 0.15 |

TABLE 1-continued

Product and performance parameters of Examples 1-10 and Comparative Example 1

| | Metal ion | S1/S | CB value | C (M) | m1/m2 | C' (M) | Capacity retention rate after 500 cycles (%) | Self-discharge of the lithium-ion battery (mV/h) |
|---|---|---|---|---|---|---|---|---|
| Example 6 | $Mg^{2+}$ | 5% | 0.7 | 0.05 | 193 | 0.005 | 83.6% | 0.18 |
| Example 7 | $Mg^{2+}$ | 5% | 0.5 | 0.05 | 322 | 0.003 | 78.3% | 0.23 |
| Example 8 | $Mg^{2+}$ | 5% | 0.95 | 0.001 | 5.1 | 0.0002 | 85.2% | 0.12 |
| Example 9 | $Mg^{2+}$ | 5% | 0.95 | 0.2 | 42 | 0.13 | 89.3% | 0.19 |
| Example 10 | $Al^{3+}$ | 5% | 0.95 | 0.95 | 26 | 0.03 | 86.2% | 0.1 |
| Comparative Example 1 | / | 5% | 0.95 | 0.95 | / | / | 72% | 0.67 |

In Table 1, "metal ion" represents a metal ion having a reduction potential higher than that of an ion in the electrolyte. "S1/S" represents the percentage of the area of the negative electrode plate corresponding to the low CB value region to the area of the negative electrode plate. "C" represents the molar concentration of the metal ion in the electrolyte. "Capacity retention rate after 500 cycles" refers to the ratio of the discharge capacity of the lithium-ion battery after 500 cycles to the discharge capacity of the first cycle. The specific calculation process will be introduced in the subsequent test method, and it will not be elaborated here. "m1/m2" represents the ratio of the content m1 of the metal element on the negative electrode plate corresponding to the low CB value region to the content m2 of the metal element on the negative electrode plate corresponding to the high CB value region per unit area. "C" represents the molar concentration of the metal ions in the electrolyte of the cycled lithium-ion battery.

For "m1/m2" and "C'" in Table 1, the lithium-ion batteries in Examples 1-10 after 500 cycles can be disassembled to obtain the cycled negative electrode plate, electrolyte and other parts. Thus, the content m1 of the metal ions in the negative electrode plate corresponding to the low CB value region and the content m2 of the metal ions in the negative electrode plate corresponding to the high CB value region, as well as the concentration C' of the metal ions in the electrolyte, can be detected.

According to the comparative analysis of the examples and the comparative example, by introducing metal ions into the electrolyte, the growth of lithium dendrites can be effectively inhibited, and the capacity retention rate and cycling performance of the lithium-ion battery can be improved.

According to the comparative analysis of Examples 1-3, the higher the percentage of the area of the negative electrode plate corresponding to the low CB value region in the lithium-ion battery to the area of the negative electrode plate is, that is, the larger the area of the low CB value region is, the larger the area of the region where the lithium deposition phenomenon occurs on the negative electrode plate after the cycling of the lithium-ion battery is. Under the same other conditions, the capacity retention rate of the lithium-ion battery will decrease as the percentage of the area of the negative electrode plate corresponding to the low CB value region to the area of the negative electrode plate increases. However, as can be seen from Example 3 and Comparative Example 1, although the percentage of the area of the negative electrode plate corresponding to the low CB value region in Example 3 to the area of the negative electrode plate is larger than that in Comparative Example 1, the capacity retention rate of Example 3 is still higher than that of the comparative example, which shows the effective inhibition of metal ions on lithium deposition and lithium dendrites. In addition, for the lithium-ion battery with a higher percentage of the area of the negative electrode plate corresponding to the low CB value region to the area of the negative electrode plate, the larger the value of m1/m2 is after cycling, and the smaller the content C' of the metal ions in the electrolyte. Therefore, it shows that in the lithium-ion battery with a higher percentage of the area of the negative electrode plate corresponding to the low CB value region to the area of the negative electrode plate, more metal ions are reduced to metal simple substances by lithium, which verifies the inhibitory effect of metal ions on lithium deposition and lithium dendrites again.

According to the comparative analysis of Examples 1 and 4-7, the smaller the CB value of the low CB value region is, the more the capacity of the positive electrode active material per unit area exceeds the capacity of the negative electrode active material per unit area, and the more lithium is deposited on the negative electrode plate corresponding to the low CB value region. Under the same other conditions, it can be seen that the capacity retention rates of Examples 4-7 show a gradually decreasing trend. Therefore, by controlling the CB value of the low CB value region within an appropriate range, the probability of serious lithium deposition in the battery caused by an excessively small CB value can be reduced. In addition, for the lithium-ion battery with a smaller CB value in the low CB value region, the larger the value of m1/m2 is after cycling, and the smaller the content C' of the metal ions in the electrolyte. The inhibitory effect of metal ions on lithium deposition and lithium dendrites is verified again.

According to the comparative analysis of Examples 1 and 8-9, the higher the concentration of the metal ions in the electrolyte is, the greater the self-discharge of the lithium-ion battery is; if the concentration of the metal ions in the electrolyte is too low (for example, in Example 8), the inhibitory effect on lithium dendrites is limited. This indicates that controlling the concentration of the metal ion in the electrolyte within an appropriate range contributes to improvement in self-discharge of the lithium-ion battery while suppressing lithium deposition and lithium dendrites.

The metal ion in Example 10 was $Al^{3+}$, and thus it is indicated that all metal ions with a reduction potential higher than that of lithium ions can effectively inhibit lithium dendrites.

The following briefly introduces the test methods for the physical and chemical parameters and performance parameters involved in the examples of the present application. It should be understood that the following test methods are only examples, and other test methods known in the art may be used for testing.

1. Test Method for Reduction Potential of Metal Ions

The reduction potential of metal ions can be obtained by measuring the potential difference between them and a standard electrode, or can be calculated according to the concentration and the Nernst equation. Illustratively, the metal or metal ion solution to be tested and a standard hydrogen electrode or a lithium electrode can be respectively used as the counter electrodes to form a primary battery, and the potential difference between the two electrodes can be tested, so as to obtain the reduction potential of the metal ions.

2. Test Method for CB Value

A positive electrode plate and a negative electrode plate of unit area were taken. After their surfaces were cleaned with DMC, they were assembled with lithium sheets into a positive electrode vs. lithium or negative electrode vs. lithium half-cell respectively. The half-cells were charged and discharged at a current of 0.04 C for 2 cycles. The charge capacity of the cathode and the discharge capacity of the anode in the second cycle were taken as the capacities of the active materials of the positive electrode or negative electrode per unit area. CB value=(capacity of the negative electrode active material per unit area)/(capacity of the positive electrode active material per unit area).

3. Test Method for Molar Concentration

The molar concentration of metal ions in the electrolyte can be determined by various methods such as titration, electrochemical analysis, spectrophotometry and inductively coupled plasma method.

Illustratively, the process of the ICP (Inductively Coupled Plasma) test method was as follows: The sample to be tested was digested with aqua regia (concentrated hydrochloric acid:concentrated nitric acid=3:1) or reverse aqua regia (concentrated nitric acid:concentrated hydrochloric acid=3: 1), and then the elemental content was determined by an ICP tester.

4. Test Method for Content of Metal Ions in Negative Electrode Plate

A part of the sample to be tested (negative electrode plate) was taken, and the content of the target element in the sample was directly measured through an ICP test.

5. Test Method for Self-Discharge of Lithium-Ion Battery

A LAND test system was used to charge the lithium-ion battery at a constant current of 8 mA to 3.8 V. Then, it was left to stand for a time T=48 h. The battery voltages before and after standing were V1 and V2 respectively. The K value (self-discharge rate) was calculated as (V1−V2)/T.

6. Test Method for Capacity Retention Rate of Lithium-Ion Battery After 500 Cycles A LAND test system was used to perform the first charge-discharge cycle on the battery.

The first charge involved charging the battery at a constant current of 60 mA to 4.2 V after formation, and then charging at a constant voltage of 4.2 V until the cut-off current reached 2 mA. The discharge capacity of the first cycle was the capacity W1 released by the battery when it was discharged at a constant current of 60 mA to a voltage of 2.5 V after formation.

The battery was then subjected to a charge-discharge test. The test process was as follows: The battery was charged at a constant current of 60 mA with a cut-off voltage of 4.2 V, then charged at a constant voltage of 4.2 V with a cut-off current of 2 mA. After standing for 10 minutes, it was discharged at a constant current of 60 mA with a cut-off voltage of 2.5 V. After 500 cycles, it was charged to 4.2 V and the test was stopped. The discharge capacity after 500 cycles was W2. The capacity retention rate of the lithium-ion battery after 500 cycles was calculated as W2/W1×100%.

Although the present application has been described with reference to some preferred embodiments, various modifications to the present application and replacements of the components therein with equivalents can be made without departing from the scope of the present application. In particular, the technical features mentioned in the embodiments may be combined in any manner provided that there is no structural conflict. The present application is not limited to the specific embodiments disclosed herein, but includes all technical solutions falling within the scope of the claims.

What is claimed is:

1. A lithium-ion battery, comprising:

an electrolyte comprising a metal ion, wherein a reduction potential of the metal ion is higher than a reduction potential of a lithium ion;

a negative electrode plate; and a low cell balance (CB) value region, wherein a CB value of the lithium-ion battery in the low CB value region satisfies: 0<CB<1, and the CB value is a ratio of a capacity of a negative electrode active material per unit area to a capacity of a positive electrode active material per unit area, and wherein a percentage X of an area of the negative electrode plate corresponding to the low CB value region in an area of the negative electrode plate satisfies: 0%<X≤10%.

2. The lithium-ion battery according to claim 1, wherein the CB value of the lithium-ion battery at the low CB value region satisfies: 0.5<CB<1.

3. The lithium-ion battery according to claim 1, wherein a reduction potential φ(Mn+/M) of the metal ion satisfies: φ(Mn+/M)+(RTlnC)/F≥φ(Li+/Li), wherein Mn+ represents the metal ion, n represents a valence of the metal ion, C represents a molar concentration of the metal ion in the electrolyte, R represents an ideal gas constant, T represents a temperature, F represents the Faraday constant, and φ(Li+/Li) represents a standard electrode potential of the lithium ion.

4. The lithium-ion battery according to claim 1, wherein the reduction potential φ(Mn+/M) of the metal ion satisfies: φ(Mn+/M)+(RTlnC)/F≤3 V vs. Li+/Li.

5. The lithium-ion battery according to claim 1, wherein the molar concentration C of the metal ion in the electrolyte satisfies: 0.001 M≤C≤0.2 M.

6. The lithium-ion battery according to claim 1, wherein the metal ion comprises at least one of Mg2+, Al3+, Zn2+ and Sb2+.

7. A lithium-ion battery, comprising:

an electrolyte comprising a metal ion, wherein a reduction potential of the metal ion is higher than a reduction potential of a lithium ion;

a low cell balance (CB) value region, wherein a CB value of the lithium-ion battery in the low CB value region satisfies: 0<CB<1; and a negative electrode plate, wherein, after cycling of the lithium-ion battery, a content m1 of a metal element corresponding to the metal ion per unit area at the negative electrode plate corresponding to the low CB value region is greater than a content m2 of the metal element corresponding to the metal ion per unit area at the negative electrode plate corresponding to a high CB value region, wherein a CB value of the lithium-ion battery in the high CB value region satisfies: $CB \geq 1$; the CB value is a ratio of a capacity of a negative electrode active material per unit area to a capacity of a positive electrode active material per unit area; and a reduction potential of a metal ion corresponding to the metal element is higher than a reduction potential of a lithium ion.

8. The lithium-ion battery according to claim 7, wherein a percentage X of an area of the negative electrode plate corresponding to the low CB value region in an area of the negative electrode plate satisfies: $0\% < X \leq 10\%$.

9. The lithium-ion battery according to claim 7, wherein a CB value of the lithium-ion battery at the low CB value region satisfies: $0.5 < CB < 1$.

10. The lithium-ion battery according to claim 7, wherein the metal element comprises at least one of Mg, Al, Zn and Sb.

11. The lithium-ion battery according to claim 7, comprising:

an electrolyte comprising a metal ion, wherein the metal ion is an ion corresponding to the metal element.

12. The lithium-ion battery according to claim 11, wherein, after cycling of the lithium-ion battery, a molar concentration C' of the metal ion in the electrolyte satisfies: $0 \leq C' < 0.2$ M.

13. An electric device, wherein the electric device comprises the lithium-ion battery according to claim 1.

14. An electric device, wherein the electric device comprises the lithium-ion battery according to claim 7.

15. The lithium-ion battery according to claim 1, wherein the CB value in the low CB value region satisfies: $0.9 < CB < 1$.

16. The lithium-ion battery according to claim 6, wherein the metal ion comprises $Sb2+$.

17. The lithium-ion battery according to claim 7, wherein the CB value in the low CB value region satisfies: $0.9 < CB < 1$.

18. The lithium-ion battery according to claim 10, wherein the metal element comprises Sb.

19. The lithium-ion battery according to claim 7, wherein a ratio of m1/m2 is from 5.1 to 322.

* * * * *